United States Patent [19]
Chaoui et al.

[11] Patent Number: 5,111,522
[45] Date of Patent: May 5, 1992

[54] OPTICAL PACKAGE WITH REDUCED DEFLECTION OF THE OPTICAL SIGNAL PATH

[75] Inventors: Ghazi M. Chaoui, Macungie; Palmer D. Smeltz, Jr., Ruscombmanor Township, Berks County, both of Pa.

[73] Assignee: AT&T Bell Laboratories, Murray Hill, N.J.

[21] Appl. No.: 657,011

[22] Filed: Feb. 19, 1991

[51] Int. Cl.$^5$ .................................................. G02B 6/36
[52] U.S. Cl. ..................................................... 385/92
[58] Field of Search ............... 350/96.20, 96.21, 96.22; 357/74, 30

[56] References Cited
U.S. PATENT DOCUMENTS

| | | | |
|---|---|---|---|
| 4,119,363 | 10/1978 | Camlibel et al. | 350/96.20 |
| 4,523,802 | 6/1985 | Sakaguchi et al. | 350/96.12 |
| 4,701,013 | 10/1987 | Jurczyszyn et al. | 350/96.20 |
| 4,747,657 | 5/1988 | Chaoui et al. | 350/96.20 |
| 4,752,109 | 6/1988 | Gordon et al. | 350/96.20 |
| 4,803,361 | 2/1989 | Aiki et al. | 250/227 |
| 4,818,053 | 4/1989 | Gordon et al. | 350/96.18 |
| 4,834,491 | 5/1989 | Aoki et al. | 350/96.20 |

FOREIGN PATENT DOCUMENTS

2124402 2/1984 United Kingdom .

OTHER PUBLICATIONS

"Packages with Full Hermeticity . . . ", *Microelectronics Journal*, vol. 12, No. 3, 1981, J. E. U. Ashton et al., pp. 14 through 18.

*Primary Examiner*—Frank Gonzalez
*Attorney, Agent, or Firm*—Wendy W. Koba

[57] ABSTRACT

An optical package is disclosed which includes attachment means for reducing deflection of the optical signal path through the package wall upon attachment of the optical package to a relatively flat surface. In particular, a flange or other notched arrangement is utilized which both reduces and shifts the torque created in the wall containing the attached fiber as a force is applied to attach the package to the flat surface. In one embodiment, symmetric front-back attachment means are utilized to provide symmetry to the overall attachment arrangement.

8 Claims, 2 Drawing Sheets

OPTICAL PACKAGE WITH REDUCED DEFLECTION OF THE OPTICAL SIGNAL PATH

BACKGROUND OF THE INVENTION

1. Technical Field

The present invention relates to an optical package and, more particularly, to an optical package with reduced deflection of the optical signal path.

2. Description of the Prior Art

Optical packages, including transmitters, receivers and/or transceivers, rely on careful alignment of the optical device to the attached optical fiber to provide optimum coupling therebetween. As a result, various systems and arrangements have been developed to align the fiber to the optical device during the fiber attachment process.

U.S. Pat. No. 4,119,363 issued to I. Camlibel et al. on Oct. 10, 1978 discloses an optical package wherein a fiber is centered within a thin-walled metal tube and the tube is inserted through an opening in the package wall. The optical device is activated and the tube adjusted (both radially and axially) within the opening until the desired degree of optical coupling is achieved. The tube is subsequently brazed to the package wall. In various embodiments of the Camlibel et al. arrangement, the fiber may include a lensed end portion to provide improved coupling efficiency.

An alternative alignment technique is disclosed in U.S. Pat. No. 4,7476,657 issued to G.M. Chaoui et al. on May 31, 1988. In this arrangement, an optical subassembly and fiber-based subassembly are aligned utilizing a computer-controlled laser welding process. The technique relies on the use of subassemblies with essentially identical outer diameters which are brought into contact and first joined at the two points where the edges of the piece parts coincide. The computer then uses a specific routine to continue the joining process so as to maximize the optical throughput.

A problem may exist with these and other conventional fiber-to-device alignment arrangements, however, in that subsequent motions of the package may disturb the integrity of the alignment and function to decouple the fiber from the optical device.

SUMMARY OF THE INVENTION

It has been discovered that although a fiber may be optimally aligned to a packaged optical device during the attachment process, a certain amount of decoupling (i.e., deflection of the optical signal path) may occur when the package is mounted on a circuit board or other relatively flat surface.

In accordance with the teachings of the present invention, it has been found that the deflection of the optical signal path may be minimized by forming the package to include means for reducing the torque created, during the package attachment process, within the package wall including the aligned fiber. In one embodiment of the present invention, the deflection reducing means comprises attachment means incorporated with the front (i.e., fiber attach) and back walls of the package. The attachment means, which are formed to comprise at least a portion with a thickness less than the package floor, function to reduce the magnitude and shift the location of the moment (torque) created in the package wall when a force is applied during the package attachment process. The act of reducing and shifting the moment thus reduces the movement of the package wall including the fiber attach and, therefore, reduces the deflection of the optical signal path passing therethrough. The attachment means, in one arrangement may comprise a notched piece part, where the notched portion comprises the reduced thickness and is utilized as the area for joining the package to the support piece. Alternatively, the attachment means may comprise a flange of the required reduced thickness.

In one embodiment of the present invention, a plurality of symmetric attachment means are utilized so as to provide relative uniformity of the force applied to the package during the attachment process.

It is an aspect of the present invention to locate the attachment means as close to the package wall as possible so as to reduce the lever arm of the moment and therefore minimize the magnitude of the package wall deflection for a given externally applied force.

Other and further aspects of the present invention will become apparent during the course of the following discussion and by reference to the accompanying drawings.

BRIEF DESCRIPTION OF THE DRAWING

Referring now to the drawings, where like numerals represent like parts in several views.

DETAILED DESCRIPTION

Figure 1:
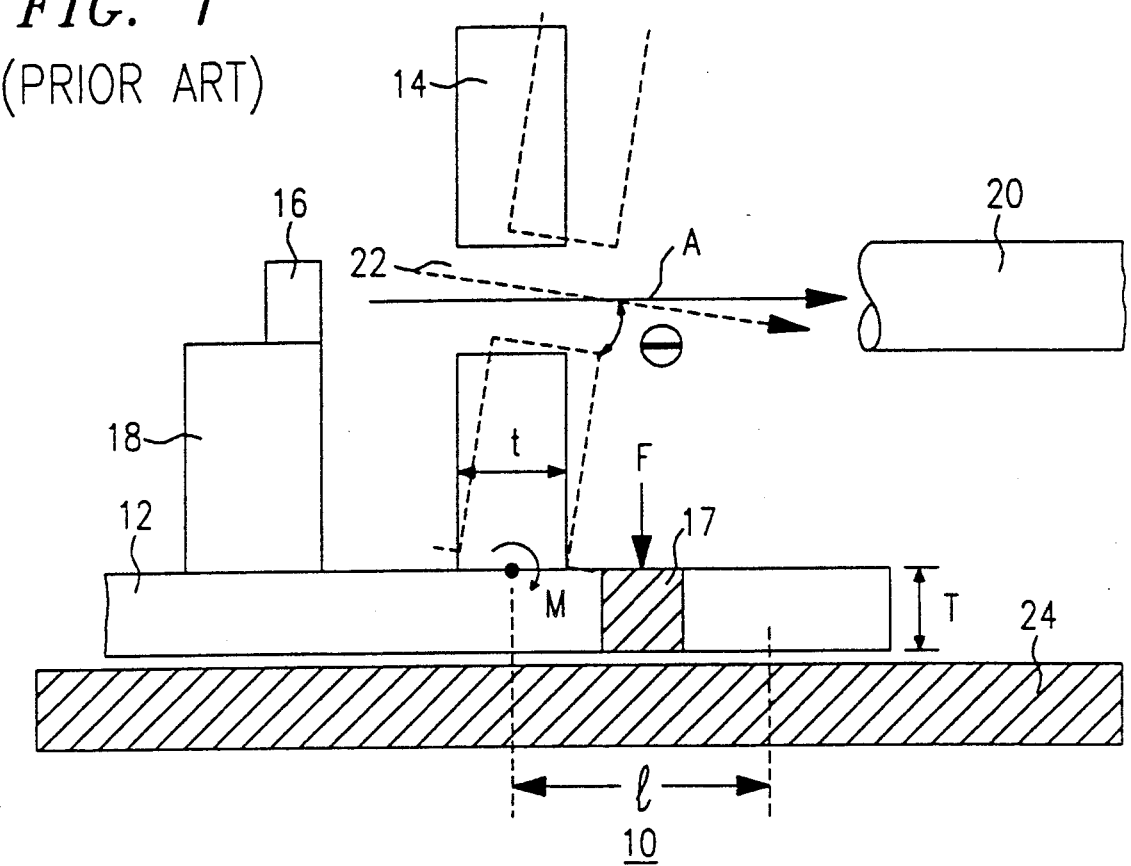
FIG. 1 shows a simplified cut-away view of a prior art optical package, illustrating in phantom the deflection of the optical signal path upon the application of a force F.

FIG. 1 contains a simplified, cut-away view of a prior art optical package 10. It is to be understood that package 10 may be used to house an optical transmitter, receiver, or any combination thereof. As shown, package 10 includes a base member 12 and a front wall 14, where base member 12 and wall 14 may or may not comprise similar materials. In most cases, member 12 and wall 14 comprise a metallic material such as Kovar ® (a trade name of a material comprising a combination of iron, nickel and cobalt). An optical device 16 (for example, a laser, LED or photodiode) is illustrated as being supported by a mounting member 18 which is attached to base member 12. An optical fiber 20 is shown as aligned with device 16 along the optical signal path A. Fiber 20 may be inserted through opening 22 in wall 14 or, alternatively, may remain external to package 10. Various lensing elements (not shown) may be disposed along optical signal path A to improve the coupling between device 16 and fiber 20.

As mentioned above, deflection of optical signal path A will most likely occur when package 10 is attached to a circuit board or other relatively flat surface. This phenomenon is illustrated in phantom in FIG. 1. In particular, package 10 is attached to a relatively flat surface 24 by applying a force F to an attachment means 26 comprising a section of base member 12 which is external to package wall 14. The application of force F thus creates a moment M (e.g., torque) in package wall 14 as shown in FIG. 1, where M is equal to F×l. Both the moment M and force F are vector quantities comprising both magnitude and direction; the term "l" is a scalar quantity defining the distance separating the location of the moment from the force. The presence of the torque during the application of force F thus results in rotating optical signal path A through an angle $\theta$, angle $\theta$ being exaggerated in FIG. 1 for the sake of illustration. As a resultr of this rotation (or deflection) of optical signal path A, coupling between device 16 and optical fiber 20 will be reduced.

Figure 2:
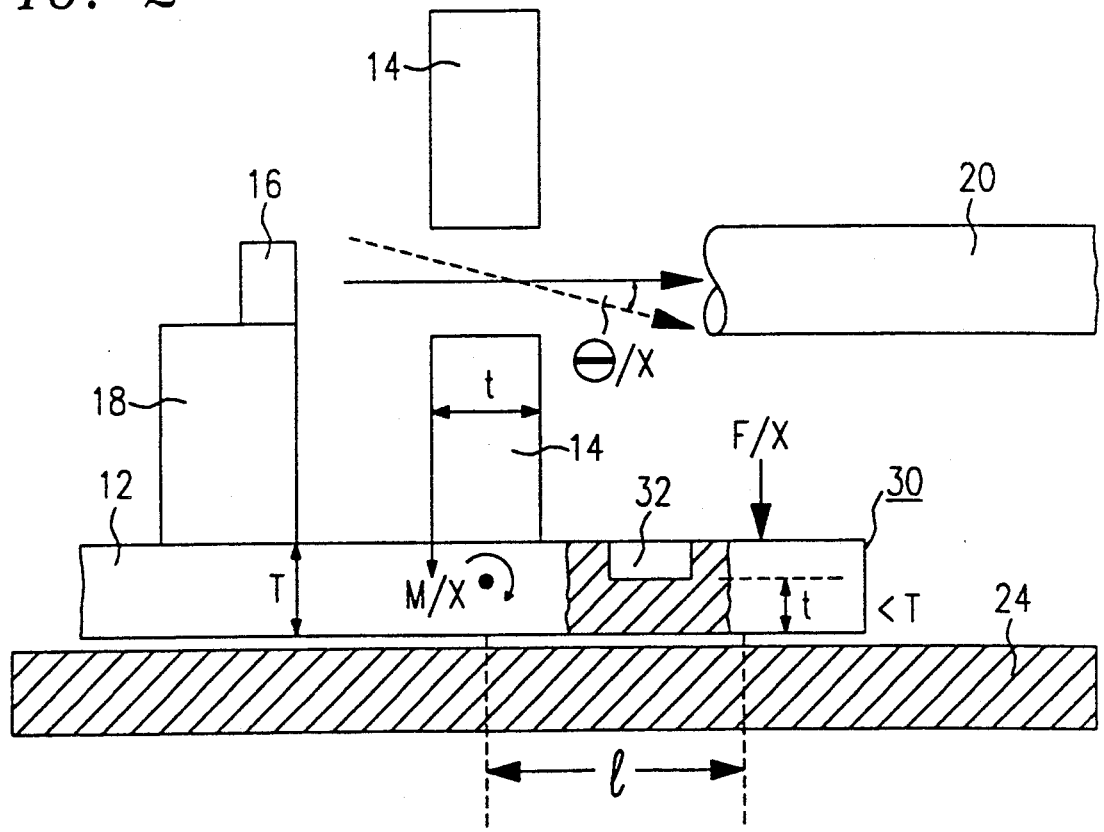
FIG. 2 shows a simplified cut-away view of an exemplary optical package of the present invention, illustrating in particular a notched attachment means, the notched portion comprising a reduced thickness capable of decreasing the deflection of the optical signal path.

In accordance with the teachings of the present invention, the above-described deflection may be reduced by decreasing the moment present in the package wall. FIG. 2 illustrates an exemplary arrangement of the present invention including an attachment means capable of reducing both the moment and deflection. In particular, package 10 of FIG. 1 is modified to replace the portion of base member 12 exterior to package wall 14 with a flange portion 30 including a notched attachment means 32 disposed as shown. Notched attachment means 32 is formed to comprise a thickness t substantially less than the thickness T of base member 12 (or wall 14). It has been found that a thickness approximately one-half that of base member 12 is sufficient to reduce the deflection of optical signal path A. The utilization of a thinned attachment region, such as notched means 32, results in the reduction of the force required to facilitate attachment of package 10 to surface 24.

As shown in FIG. 2, a force of the strength F/x (x being greater than unity) is applied as shown within notched means 32 and results in the creation of a reduced moment M/x, where as shown in FIG. 2 the moment has shifted downward in the direction indicated by the arrow. The deflection of optical signal path A, therefore, is reduced to the value $\theta/x$ as shown in FIG. 2. As discussed above, the reduction of the magnitude of the moment, as well as its shift downward away from the optical signal path, functions to lessen the deflection of the optical signal path. Accordingly, the integrity of the coupling between optical device 16 and fiber 20 may be maintained by virtue of the thinned attachment means of the arrangement of the invention as illustrated in FIG. 2. The location of notched means 32 as close to wall 14 as possible will further to reduce the magnitude of moment M by reducing the separation l between the location of the moment and the application of the force.

Figure 3:
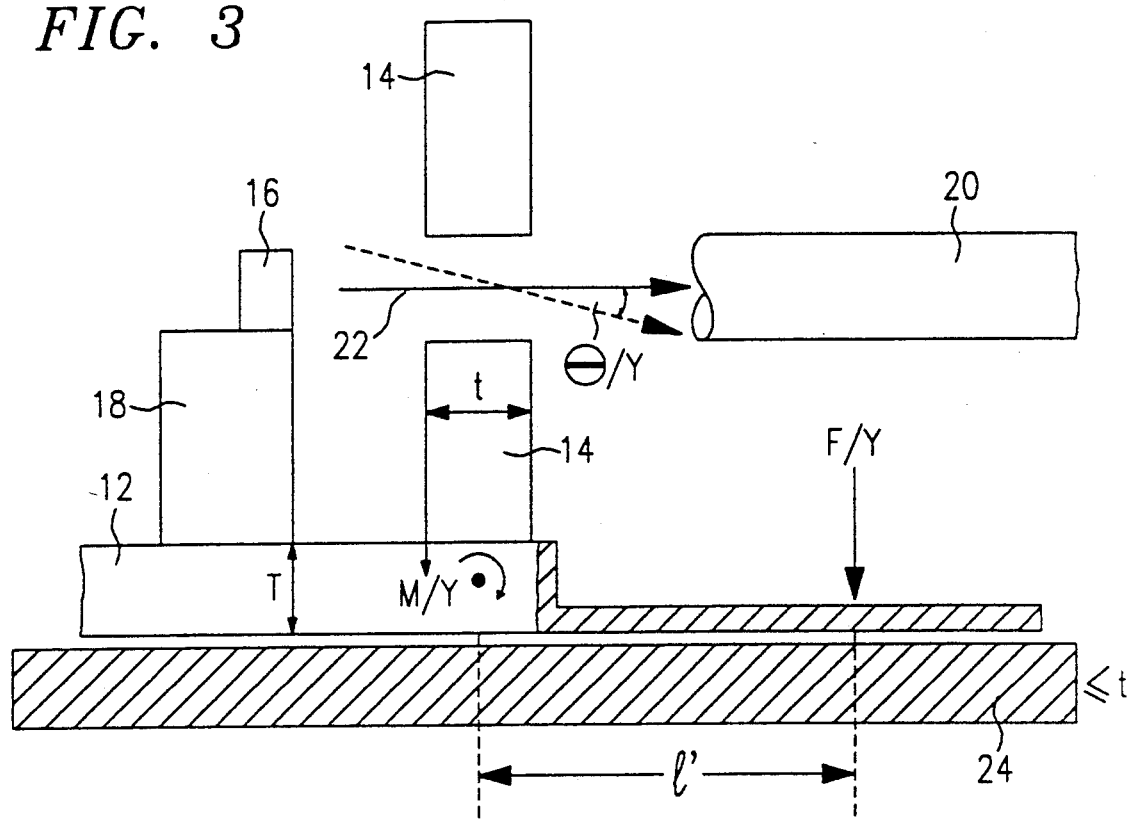
FIG. 3 shows a simplified cut-away view of an alternative optical package of the present invention, illustrating in particular a flanged attachment means, the flange comprising a reduced thickness capable of decreasing the deflection of the optical signal path.

In an alternative package arrangement of the present invention, the ability to locate the attachment means as close to wall 14 as possible is improved (with respect to the arrangement of FIG. 2) by replacing attacheument means 30 (FIG. 2) with a flanged attachment portion 34, as shown in FIG. 3, where portion 34 is relatively flat and comprises a thickness t. With this particular embodiment, it is no longer necessary to form a notch in the attachment means, thus simplifying the manufacturing process of the arrangement of FIG. 3.

Figure 4:
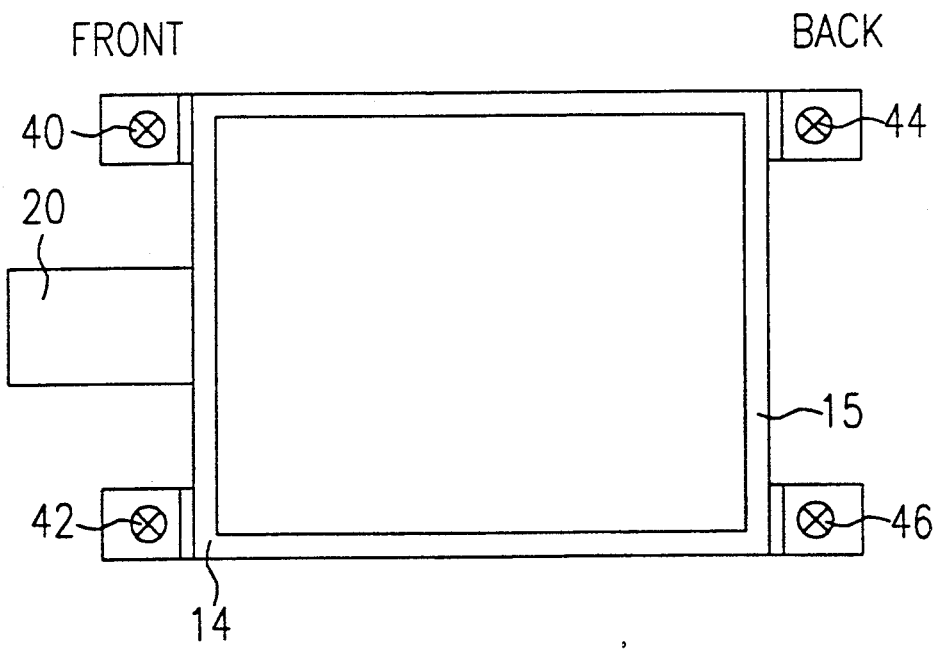
FIG. 4 illustrates a simplified top view of an optical package including symmetric attachment means formed in accordance with the teachings of the present invention.

The attachment of an optical package to a flat surface is further improved, as noted above, by utilizing a plurality of symmetrically disposed attachment means along the front and back walls of the optical package. A simplified cut-away top view of package 10 is shown in FIG. 4, illustrating in particular the location of a plurality of attachment means 40, 42, 44 and 46 with respect to front wall 14 and back wall 15 of package 10. It is to be understood that such an arrangement is exemplary only and various other dispositions of the attachment means with respect to the fiber attach package wall are considered to fall within the spirit and scope of the present invention.

We claim:

1. An optical package including a base member for supporting an optical device contained therein and at least one package wall including an optical signal path disposed therethrough for providing coupling between the optical device and an optical communication fiber, the package comprising
   attachment means disposed contiguous to the base member and externally adjacent to the at least one package wall for securing said optical package to a relatively flat surface, the attachment means comprising a portion with a predetermined thickness less than the thickness of the base member.

2. An optical package as defined in claim 1 wherein the attachment means comprises a notched attachment means, the notch portion formed to comprise the predetermined reduced thickness.

3. An optical package as defined in claim 1 wherein the attachment means comprises a flanged attachment means formed to comprise the predetermined reduced thickness.

4. An optical package as defined in claim 1 wherein the optical signal path is disposed through a front wall in the optical package, the package further defined as comprising a back wall disposed in opposition to the front wall, the attachment means comprising
   a first attachment means disposed adjacent to the front wall; and
   a second attachment means disposed adjacent to the back wall.

5. An optical package as defined in claim 4 wherein
   the first attachment means comprises a notched attachment means, the notched portion formed to comprise the predetermined reduced thickness; and
   the second attachment means comprises a notched attachment means, the notched portion formed to comprise the predetermined reduced thickness.

6. An optical package as defined in claim 5 wherein
   the first attachment means comprises a first pair of notched attachment means, adjacent to opposite ends of the front package wall; and
   the second attachment means comprises a second pair of notched attachment means, adjacent to opposite ends of the back package wall.

7. An optical package as defined in claim 4 wherein
   the first attchment means comprises a flanged attachment means comprising the predetermined reduced thickness; and
   the second attachment means comprises a flanged attachment means comprising the predetermined reduced thickness.

8. An optical package as defined in claim 7 wherein
   the first flanged attachment means comprises a pair of flanged attachments means, adjacent to opposite ends of the front package wall; and
   the second flanged attachment means comprises a pair of flanged attachment means, adjacent to opposite ends of the back package wall.

* * * * *